(12) United States Patent
Nyamwange et al.

(10) Patent No.: US 12,531,748 B2
(45) Date of Patent: Jan. 20, 2026

(54) SYSTEM FOR DYNAMIC, SECURE, TOKEN-BASED SNAPSHOT GENERATION

(71) Applicant: BANK OF AMERICA CORPORATION, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Yaksh, Austin, TX (US); Hari Vuppala, Concord, NC (US); Pratap Dande, Saint Johns, FL (US); Brian Neal Jacobson, Los Angeles, CA (US); Erik Dahl, Newark, DE (US); Rahul Shashidhar Phadnis, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 190 days.

(21) Appl. No.: 18/234,254

(22) Filed: Aug. 15, 2023

(65) Prior Publication Data

US 2025/0062908 A1   Feb. 20, 2025

(51) Int. Cl.
*H04L 9/32* (2006.01)
*G06F 16/11* (2019.01)

(52) U.S. Cl.
CPC .......... *H04L 9/3247* (2013.01); *G06F 16/128* (2019.01)

(58) Field of Classification Search
None
See application file for complete search history.

(56) References Cited

U.S. PATENT DOCUMENTS

| | | | |
|---|---|---|---|
| 7,296,160 B2 | 11/2007 | Hiltgen |
| 7,577,987 B2 | 8/2009 | Mizrah |
| 8,341,714 B2 | 12/2012 | Muller |
| 8,752,146 B1 | 6/2014 | Van Dijk |
| 9,215,224 B2 | 12/2015 | Band |
| 10,075,437 B1 | 9/2018 | Costigan |
| 10,205,711 B2 | 2/2019 | Mennes |
| 10,673,862 B1 | 6/2020 | Threlkeld |

(Continued)

FOREIGN PATENT DOCUMENTS

| | | |
|---|---|---|
| WO | 2024036832 A1 | 2/2024 |
| WO | 2024085980 A1 | 4/2024 |

*Primary Examiner* — William J. Goodchild
*Assistant Examiner* — Mayasa A. Shaawat
(74) *Attorney, Agent, or Firm* — Moore & Van Allen PLLC; Anup Iyer

(57) ABSTRACT

Systems, computer program products, and methods are described herein for dynamic, secure, token-based snapshot generation. The present disclosure is configured to receive, via an alternative access point, a user request to receive a snapshot of one or more resource repositories associated with a user; generate, using a token generator, a token based on at least the user request; authenticate, using an authentication subsystem, the user using the token to confirm legitimacy of the user request; generate, using a snapshot generator, the snapshot of the one or more resource repositories based on at least confirming the legitimacy of the user request, wherein the snapshot is generated based on predefined user preferences; embed, using a digital signature subsystem, the snapshot with a digital signature serving as an attestation; and display the snapshot on the user input device.

20 Claims, 5 Drawing Sheets

(56) References Cited

U.S. PATENT DOCUMENTS

| | | |
|---|---|---|
| 10,798,090 B2 | 10/2020 | Ogawa |
| 10,896,249 B2 | 1/2021 | Hruska |
| 11,075,758 B2 | 7/2021 | Beric |
| 11,632,247 B2 | 4/2023 | Modi |
| 11,750,397 B2 | 9/2023 | Seaborn |
| 11,971,967 B2 | 4/2024 | Bolotin |
| 2007/0101152 A1 | 5/2007 | Mercredi |
| 2015/0161079 A1* | 6/2015 | Grosfeld .............. G06F 40/103 715/209 |
| 2017/0012951 A1* | 1/2017 | Mennes ................. H04L 63/10 |
| 2019/0354659 A1* | 11/2019 | Barillari ............. G06F 16/5866 |
| 2022/0217147 A1 | 7/2022 | Pate |
| 2023/0022797 A1 | 1/2023 | Chitalia |
| 2024/0106653 A1 | 3/2024 | Valkaitis |

* cited by examiner

SYSTEM FOR DYNAMIC, SECURE, TOKEN-BASED SNAPSHOT GENERATION

TECHNOLOGICAL FIELD

Example embodiments of the present disclosure relate to a system for dynamic, secure, token-based graphical user interface (GUI) generation.

BACKGROUND

In the evolving landscape of mobile banking, ensuring user convenience without compromising security remains a paramount concern. As users increasingly demand instant access to their financial summaries, the traditional methods of logging in and navigating through multiple authentication steps become cumbersome.

Applicant has identified a number of deficiencies and problems associated with dynamic, secure, token-based snapshot generation. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for dynamic, secure, token-based snapshot generation.

In one aspect, a system for dynamic, secure, token-based snapshot generation is presented. The system comprising: a processing device; a non-transitory storage device containing instructions when executed by the processing device, causes the processing device to: establish an alternative access point on a user input device, wherein the alternative access point is operatively coupled to an application; receive, via the alternative access point, a user request to receive a snapshot of one or more resource repositories associated with a user; generate, using a token generator, a token based on at least the user request; authenticate, using an authentication subsystem, the user using the token to confirm legitimacy of the user request; generate, using a snapshot generator, the snapshot of the one or more resource repositories based on at least confirming the legitimacy of the user request, wherein the snapshot is generated based on pre-defined user preferences; embed, using a digital signature subsystem, the snapshot with a digital signature serving as an attestation; and display the snapshot on the user input device.

In some embodiments, executing the instructions further causes the processing device to: dynamically retrieve an account information from each resource repository; compile the account information received from each resource repository, wherein compiling further comprises generating a summary of account information received from each resource repository; determine user preferences associated with the user request; and generate the snapshot using the summary of account information received from each resource repository in accordance with the user preferences.

In some embodiments, executing the instructions further causes the processing device to: retrieve information associated with a prior snapshot of the user, wherein the prior snapshot comprises a summary of account information received from each resource repository in response to a prior user request; determine, using a data analytics subsystem, a difference in account information based on at least the summary of account information associated with the user request and the summary of account information associated with the prior user request; and populate the snapshot with the difference in account information for each resource repository.

In some embodiments, the token comprises at least one of a unique identifier associated with the user input device, a time stamp of the user request, an originating Internet protocol (IP) address, and authentication credentials of the user required to access the resource repository.

In some embodiments, the token is unique, non-reusable, and is generated specifically for the user request.

In some embodiments, executing the instructions further causes the processing device to: receive, from the user input device, user preferences associated with the generation of the snapshot, wherein the user preferences comprise at least a pre-define format.

In some embodiments, the pre-defined format comprises at least a text-based format, a data interchange format, a document format, an image format, a spreadsheet format, a presentation format, audio format, video format, and database format.

In some embodiments, the alternative access point is an enhancement associated with the application, wherein the enhancement is configured to allow the user to request the snapshot without requiring the user to authenticate themselves with the application.

In some embodiments, the alternative access point is a widget associated with the application, wherein the widget is configurable on the user input device enabling a direct link to request the snapshot.

In some embodiments, the alternative access point is a deep link into the application configured to guide the user request to directly to portions of the application capable of providing the snapshot.

In some embodiments, the alternative access point is a custom voice command associated with the application.

In another aspect, a computer program product for dynamic, secure, token-based snapshot generation is presented. The computer program product comprising a non-transitory computer-readable medium comprising code configured to cause an apparatus to: establish an alternative access point on a user input device, wherein the alternative access point is operatively coupled to an application; receive, via the alternative access point, a user request to receive a snapshot of one or more resource repositories associated with a user; generate, using a token generator, a token based on at least the user request; authenticate, using an authentication subsystem, the user using the token to confirm legitimacy of the user request; generate, using a snapshot generator, the snapshot of the one or more resource repositories based on at least confirming the legitimacy of the user request, wherein the snapshot is generated based on pre-defined user preferences; embed, using a digital signature subsystem, the snapshot with a digital signature serving as an attestation; and display the snapshot on the user input device.

In yet another aspect, a method for dynamic, secure, token-based snapshot generation is presented. The method comprising: establishing an alternative access point on a user input device, wherein the alternative access point is operatively coupled to an application; receiving, via the alternative access point, a user request to receive a snapshot of one or more resource repositories associated with a user; generating, using a token generator, a token based on at least the user request; authenticating, using an authentication subsystem, the user using the token to confirm legitimacy of the user request; generating, using a snapshot generator, the snapshot of the one or more resource repositories based on at least confirming the legitimacy of the user request, wherein the snapshot is generated based on pre-defined user preferences; embedding, using a digital signature subsystem, the snapshot with a digital signature serving as an attestation; and displaying the snapshot on the user input device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
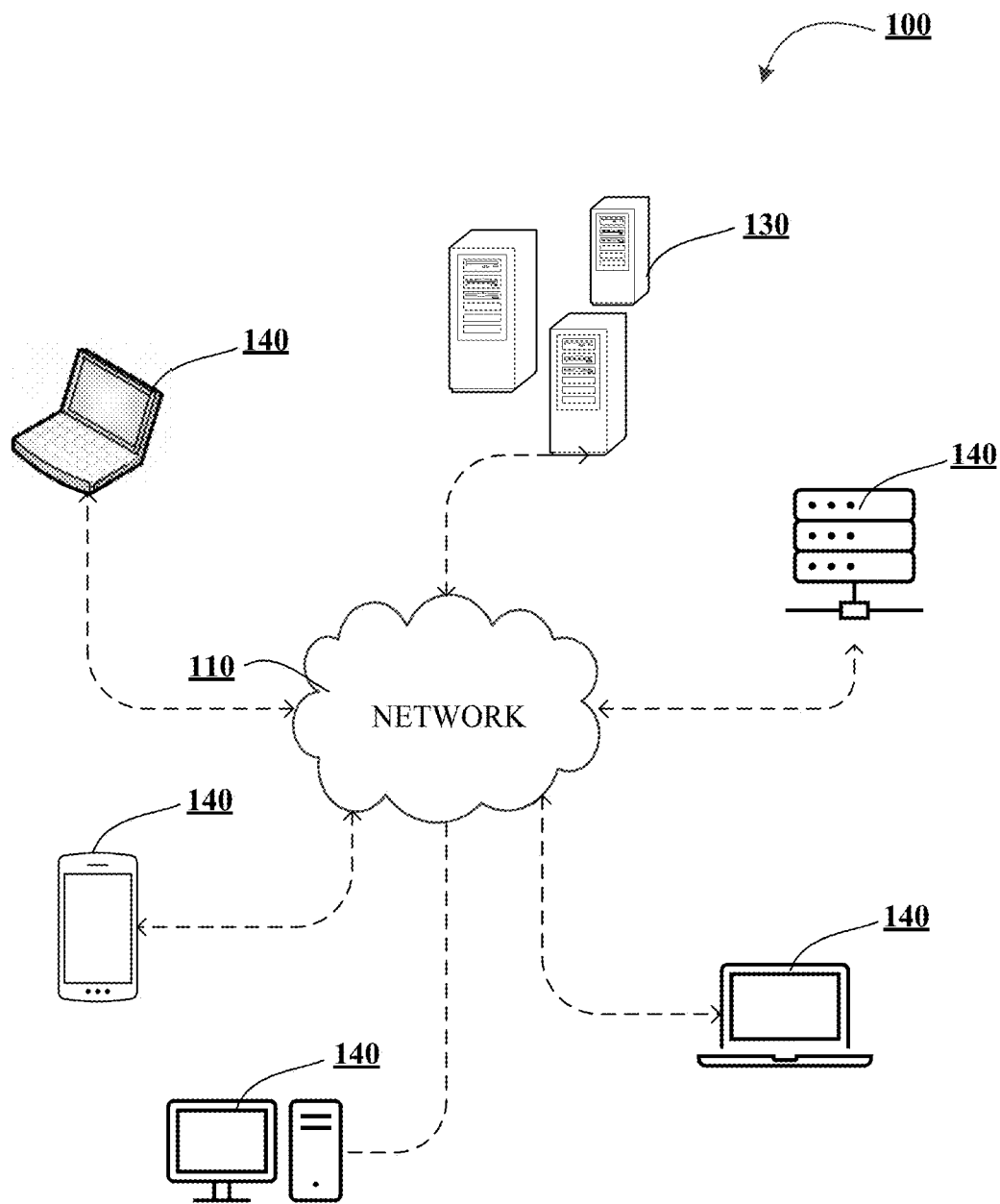
Figure 1B:
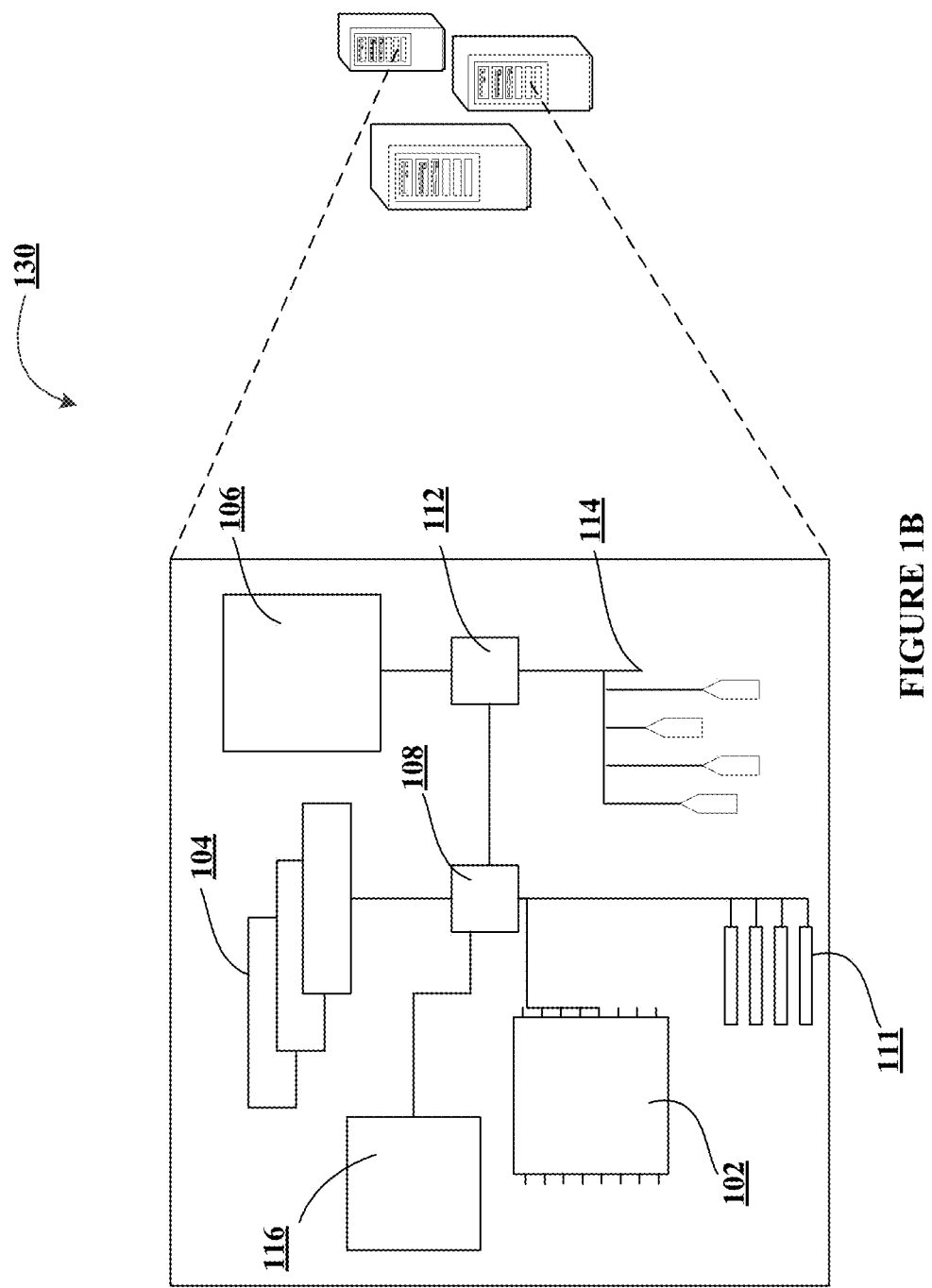
Figure 1C:
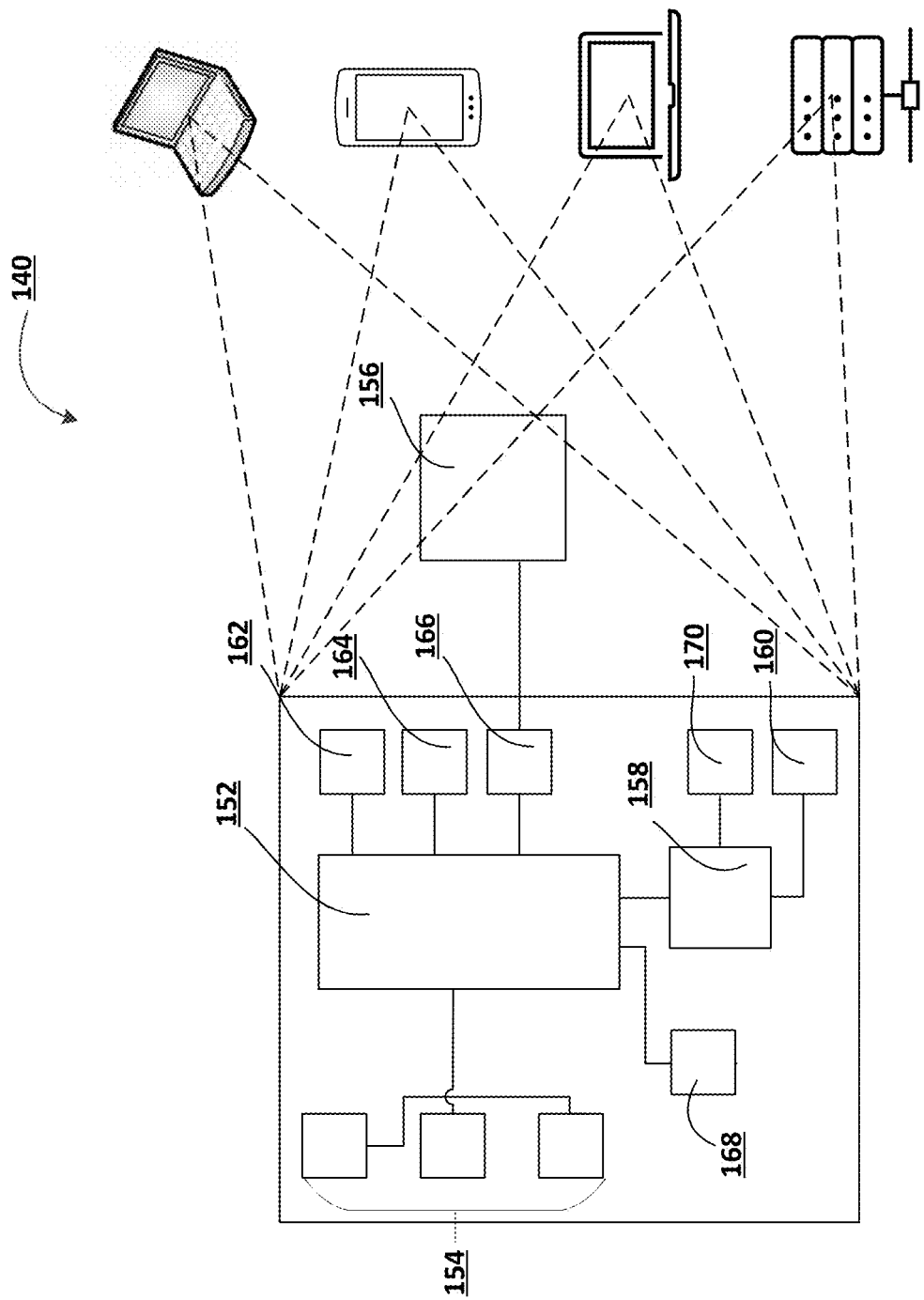
Figure 2:
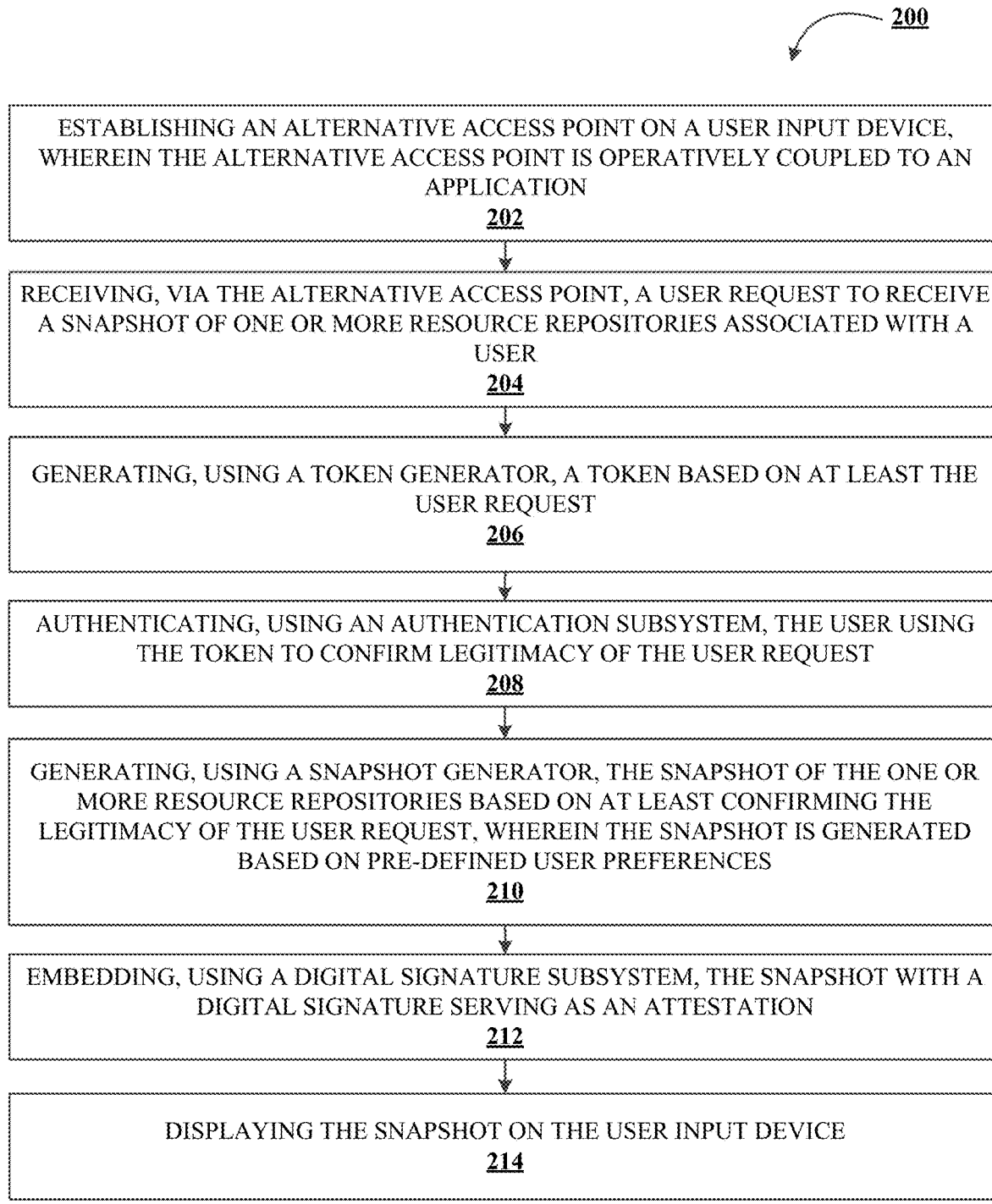
Figure 3:
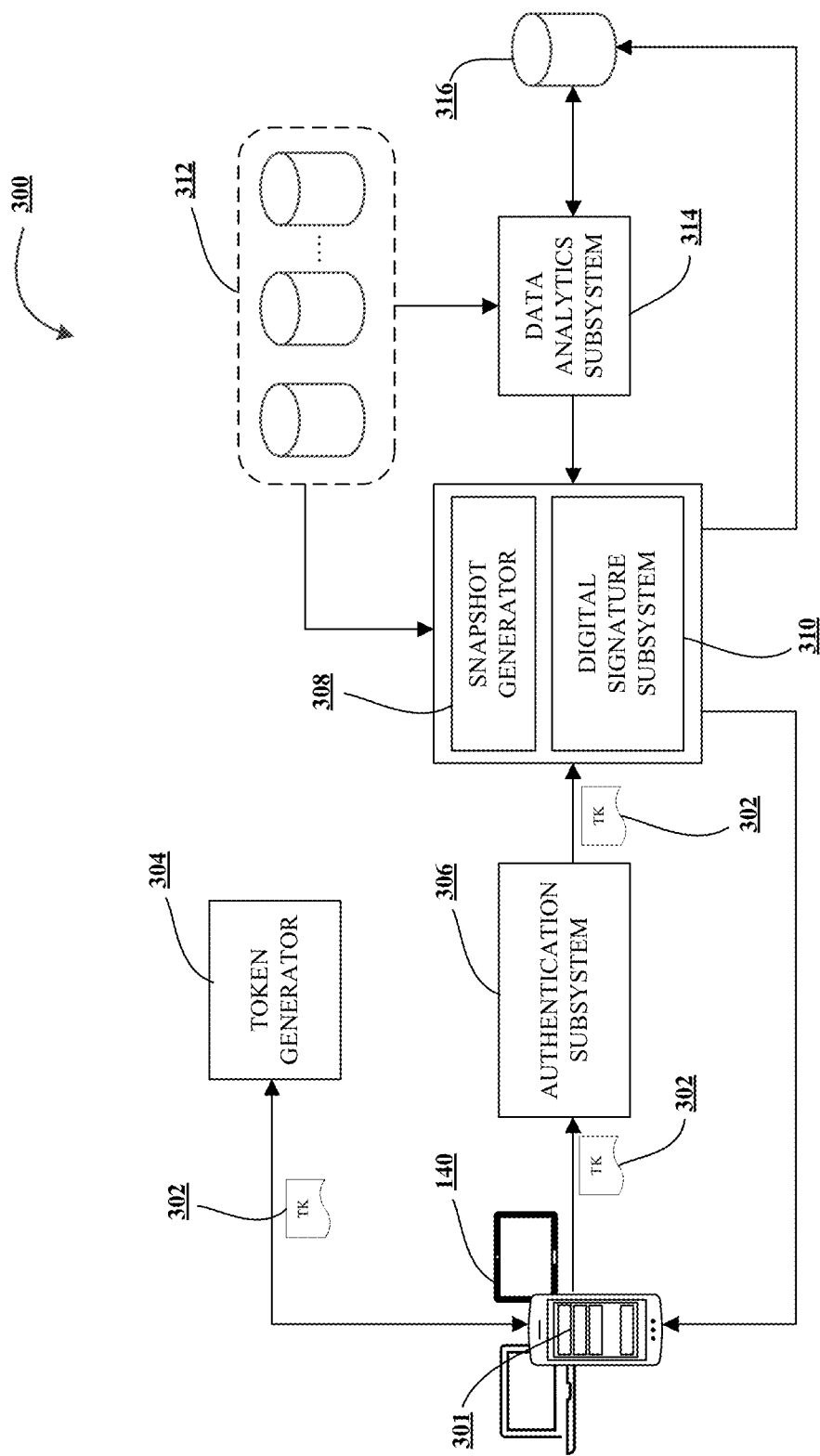

FIGS. 1A-1C illustrates technical components of an exemplary distributed computing environment for dynamic, secure, token-based snapshot generation, in accordance with an embodiment of the disclosure;

FIG. 2 illustrates a process flow for dynamic, secure, token-based snapshot generation, in accordance with an embodiment of the disclosure; and FIG. 3 illustrates a data flow diagram for dynamic, secure, token-based snapshot generation, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In the evolving landscape of mobile banking, ensuring user convenience without compromising security remains a paramount concern. As users increasingly demand instant access to their financial summaries, the traditional methods of logging in and navigating through multiple authentication steps become cumbersome. Moreover, the conventional ways of accessing and comparing account changes are not always intuitive. Coupled with the ever-present threat of unauthorized access to sensitive data, there is an urgent need for a system that seamlessly blends ease of access with robust security measures.

To address these challenges, embodiments of the invention provide an alternative access point for the user to access particular information, such as a snapshot of their account summary, related to their financial institution accounts without requiring the user to navigate through a comprehensive set of authentication protocols. To balance this streamlined access with robust security, the system may utilize a one-time token. This token is unique, non-reusable, and is generated specifically for the user's snapshot request. The token may include unique identifiers such as the user's account number, the timestamp of the request, and the originating Internet protocol (IP) address. These details are used to authenticate the user and to confirm the legitimacy of the request. Once the user is authenticated, the system proceeds to generate the requested snapshot. The format of this snapshot can vary based on user preferences. Prior to transmission to the user, the snapshot is embedded with a digital signature. This signature serves as an attestation, further enhancing the security of the system.

FIGS. 1A-1C illustrate technical components of an exemplary distributed computing environment for dynamic, secure, token-based snapshot generation 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for dynamic, secure, token-based snapshot generation, in accordance with an embodiment of the disclosure. As shown in block 202, the process flow includes establishing an alternative access point on a user input device, wherein the alternative access point is operatively coupled to an application. As used herein, an alternative access point may refer to a supplemental route for users to access specific information without replacing the traditional login or access mechanisms of the application. The primary motivation behind an alternative access point is to make the user's interaction with the entity more efficient. Navigating through multiple authentication steps can be time-consuming and, at times, tedious. The alternative access point may be used to circumvent this by providing direct access to the specific information (e.g., snapshot of account information) without the need for detailed authentication.

In some embodiments, the alternative access point may be an enhancement or an added functionality, rather than being a core feature of the application. In one aspect, as an enhancement, the alternative access point may be designed to integrate seamlessly with the existing application infrastructure, ensuring that there's no disruption to the main app's operations. In some other embodiments, the alternative access point may be a widget linked to the application. In one aspect, a widget may be a small, stand-alone application component that runs on a user input device and offers a specific, often simplified, function. Here, the widget serves a distinct purpose: providing a direct pathway for users to request a snapshot of their account information. In specific embodiments, the widget may be configurable by the user. Instead of opening the full application and navigating through various sections, the user can utilize this widget to access the desired snapshot, streamlining the user experience and offering quicker access directly to pertinent data. In still other embodiments, the alternative access point may be a deep link within the application. In one aspect, a deep link may be a direct pathway or shortcut that bypasses the initial layers or interfaces of an application and takes the user straight to a specific location or function within the application. In this case, the deep link may be designed to guide users straight to the sections of the application responsible for delivering the snapshot of the account information. This ensures that users do not have to navigate through the entire application, reducing unnecessary steps and offering a more efficient and streamlined access to the desired information.

As shown in block 204, the process flow includes receiving, via the alternative access point, a user request to receive a snapshot of one or more resource repositories associated with a user.

As shown in block 206, the process flow includes generating, using a token generator, a token based on at least the user request. In some embodiments, the token may be a digital resource that is designed to streamline user access to specific information while preserving rigorous security standards. In some embodiments, addressing the challenges of traditional authentication methods, which may hinder the instantaneous and intuitive access users demand, this one-time, non-reusable token may serve as an alternative pathway for users. Instead of undergoing multiple steps of authentication, the unique token may be used to procure particular data, such as a snapshot of their account summary. For assurance and authenticity, the token may be generated with distinct attributes such as a unique identifier associated with the user input device, a time stamp of the user request, an originating Internet protocol (IP) address, authentication credentials of the user required to access the resource repository, and/or the like. These attributes embedded within the token assist in user authentication and verification of the request's legitimacy.

In some embodiments, the token generator may be a software or hardware component responsible for creating tokens, often used in authentication and authorization processes. In one aspect, the token generator may include a random number generator (RNG) to produce random or pseudo-random numbers, a cryptographic algorithms to provide the mathematical foundation for encrypting data, making the tokens secure, storage or memory for temporary data retention during the token creation process, a processing unit to execute the necessary algorithms, an input interface to facilitate the reception of external data or parameters, an output interface to manage the dissemination or storage of the generated token, a time source to produce time-based tokens and to maintain synchronization with verifying systems, configuration management mechanism for a user (e.g., administrator) to define operational parameters, and security mechanisms are in place to shield the token generator from potential exposure, and/or. In some embodiments, or seamless integration into broader systems, software-based token generators might offer application programming interfaces (APIs) or software development kits (SDKs).

As shown in block 208, the process flow includes authenticating, using an authentication subsystem, the user using the token to confirm legitimacy of the user request. In some embodiments, the authentication subsystem may be a specialized component or module within the overarching system (e.g., system 130), specifically tailored for the purpose of verifying the identities of users or entities attempting to access the system. As described herein, the token may include individual elements that serve as identifying markers that may be used to recognize and validate the identity of the user. To this end, the system may employ the authentication subsystem to dissect the token and extract the embedded details. Upon extracting the embedded details, the authentication subsystem may cross-reference the information with user data stored in secure internal repositories. For example, the authentication subsystem may determine whether the account number matches with any existing records, if the timestamp is within an acceptable range, and if the IP address aligns with known, safe addresses associated with the user, and/or the like. Should all these checks pass, the user's request is deemed legitimate, and they are authenticated. On the other hand, if there's a discrepancy—say, the IP address does not align with the user's typical locations, or the timestamp suggests an unreasonable delay between token generation and request—the authentication subsystem may flag the request as suspicious. In response, the authentication subsystem may either request additional verification steps from the user, or outright deny the user request.

As shown in block 210, the process flow includes generating, using a snapshot generator, the snapshot of the one or more resource repositories based on at least confirming the legitimacy of the user request, wherein the snapshot is generated based on pre-defined user preferences.

In some embodiments, the system may include a snapshot generator to generate a snapshot of the one or more resource repositories. A snapshot generator may be a specialized system with software and/or hardware components configured for creating instantaneous, condensed views or representations of a larger dataset or system status at a specific point in time. As described herein, the snapshot generator may refer to a tool or mechanism that collates and presents user-specific account details in a digestible format. To generate the snapshot, the snapshot generator may dynamically retrieve account information associated with each resource repository. To retrieve the account information, in some embodiments, the snapshot generator may employ extract, transform, load (ETL) processes. During the extraction phase, the account information is fetched from each resource repository; transformation involves cleaning, enriching, and structuring the account information into a usable format; and load involves storing the prepared account information is a warehouse or any other optimized system.

In some embodiments, account information may refer to a multifaceted array of data pertaining to a customer's financial relationship with the entity. This may include personal information, which may include the account holder's full legal name, date of birth, contact details, addresses, identification numbers, and occupation, account details, which may include a unique account number, the type of account (e.g., savings, checking, etc.), the current balance, the associated interest rate, the date of inception, and its current operational status, transaction history, which may offer a chronological account of financial activities, detailing transaction dates, types, amounts involved, the post-transaction balance, and unique reference codes for each transaction, security protocols which necessitate the collection of digital authentication data, such as user IDs, passwords, security questions, and two-factor authentication mechanisms. Moreover, the user's association with the entity may extend to other products and services (e.g., financial products and services), with details of these relationships being recorded. Pertinent statements, tax documentation, terms of service, and other official documents form another segment of account information. When applicable, the account information may also include beneficiary and joint account holder details, specifics of financial funds, including principal amounts, amount of funds owed, products and services terms, and other information. Additionally, account information may include nuanced elements such as the user's communication preferences, marketing choices, and any lodged feedback.

Upon retrieving the account information, the system may compile the account information to generate a summary of the account information received from each resource repository. In some embodiments, to generate a summary of the account information, the snapshot generator may categorize the account information into predefined segments. In example embodiments, the categories may include personal information, account details, and transaction history, establishing a foundational hierarchy. Once categorized, the snapshot generator may format the account information. For example, components such as transaction history may be presented in tabular sequences, highlighting chronological transactions. To enhance comprehension, certain categories may be better suited for graphical representation-using tools like pie charts for fund distributions or line graphs depicting account balance trends. In some embodiments, the snapshot generator may employ aggregative techniques to provide succinct overviews, for example, illustrating monthly total expenditures rather than individual transactions. In some other embodiments, the snapshot generator may generate an executive summary, offering a panoramic snapshot supplying users with pivotal insights at a glance, and contextual clarifications facilitated through the insertion of annotations or footnotes. In additional embodiments, the snapshot generator may reinforce uniformity and clarity using a consistently structured template, augmented with professional styling elements like strategic color schemes and typography. In particular embodiments, the snapshot generator, prior to finalization, may execute iterative reviews of the summary, optimizing both its accuracy and presentation. Lastly, the snapshot generator may execute a verification protocol that ensure alignment with supervisory standards, data privacy norms, and entity guidelines.

In some embodiments, upon compiling the account information, the snapshot generator may determine user preferences associated with the user request. User preferences may refer to the specific choices and settings selected by a user to customize their experience when interacting with a digital platform (e.g., system 130). User preferences may include layout, content type, frequency, granularity of detail, and notification settings, among others. By tailoring these settings, users can receive the snapshot in a manner that aligns most closely with their requirements. For example, by specifying the content type, users may emphasize specific data types, such as transaction details, balance overviews, or investment insights, by specifying layout and display, users may opt for a graphical representation (like pie charts or bar graphs) while others might prefer tabular or list-based displays, by specifying frequency, user may dictate whether summaries are generated daily, weekly, monthly, or based on a custom timeframe, by specifying the granularity of detail, users may choose between high-level snapshots or more detailed, drill-down summaries, and/or the like.

In some embodiments, the user preferences may include a pre-defined format. The pre-defined format may include a text-based format, a data interchange format, a document format, an image format, a spreadsheet format, a presentation format, audio format, video format, database format, and/or the like. The text-based format may offer a simple and often plaintext representation, particularly for user input devices without intricate display functionalities. On the other hand, data interchange formats like JavaScript Object Notation (JSON) and extensible Markup Language (XML) may be tailored for users, such as developers, or those aiming to weave their financial data into existing software tools. Document formats, such as Portable Document Format (PDF) or Microsoft Word Open XML Document (DOCX), may be useful for users looking for portability, the ease of printing, or sharing their summaries. Individuals desiring visual depictions of their financial landscape might gravitate towards image formats, such as Joint Photographic Experts Group (JPEG) or Portable Network Graphics (PNG), capturing snapshots of intricate graphs or data visualizations, suitable for embedding in presentations or digital platforms. For data manipulation and analysis, the spreadsheet format, including Excel Spreadsheet (XLS) or Comma-Separated Values (CSV), may be a preferred format of choice. Presentation formats, like PowerPoint Presentation (PPT) may be used when there is a need to showcase financial narratives in meetings or structured reviews. The audio format may be used to serve as a vocal rendition of summaries. The video format, merging visuals, animations, and voiceovers, offers a comprehensive multimedia experience, making financial data both engaging and explanatory. Lastly, for users with a penchant for integrating summaries into broader data ecosystems, the database format, such as Structured Query Language (SQL) dumps, becomes the optimal choice, ensuring seamless data amalgamation.

In some embodiments, the snapshot may be a visual and interactive interface that allows the user to quickly discern their financial status. The primary objective of this interface is to provide users with an immediate understanding of their financial situation. The interactivity might involve clickable elements, allowing users to drill down into specific sections for more detailed information or toggle between different views. This combination of visual presentation and user interaction ensures that users can efficiently grasp the nuances of their financial data without sifting through verbose reports or dense tables.

In some embodiments, the system may employ a methodical approach to compare and highlight changes in a user's account information, drawing from both recent and prior data requests to provide an updated snapshot. To this end, the system may first retrieve information related to a previous snapshot of the user. The previous snapshot may include a summary of account information that was collected from each resource repository when the user last requested it. Once retrieved, a data analytics subsystem may be used to identify differences in the account information.

In some embodiments, as described herein, the data analytics subsystem may be a specialized component within a larger system (e.g., system 130) designed specifically for analyzing vast amounts of data to extract meaningful insights. The data analytics subsystem may be equipped with algorithms and processed tailored to analyze, process, and interpret the account information. In one aspect, the data analytics subsystem may be tasked with various operations, including data cleaning (removing or correcting erroneous data), normalization (scaling data to a standard range), and transformation (converting data into a suitable format or structure for analysis). In some embodiments, the data analytics subsystem may utilize statistical models to identify patterns, trends, and anomalies in the data. In this regard, the data analytics subsystem may employ machine learning techniques to enhance its predictive capabilities, allowing for more proactive data analysis over time. For instance, when identifying differences in account information, the data analytics subsystem may be used to not only pinpoint the discrepancies but also categorize them based on their significance or potential impact on the user.

In some embodiments, the differences in the account information may be identified by comparing the current summary of account information, obtained from the recent user request, with the summary from the prior user request. Upon identifying the differences in the account information, the system may update the snapshot to display these differences in account information from each resource repository.

In doing so, the user may be presented with a snapshot that highlights the changes or updates in their account information since their last request.

As shown in block 212, the process flow includes embedding, using a digital signature subsystem, the snapshot with a digital signature serving as an attestation. In some embodiments, the digital signature subsystem may serve as a fundamental component in ensuring data integrity and source authentication for snapshots of user information. In some embodiments, when a snapshot is generated, the digital signature subsystem may process the data using a cryptographic hash function, resulting in a unique fixed-size string of bytes. The hash may then be encrypted with the sending entity's private key, creating the digital signature. The digital signature may then be attached to the snapshot before transmission. On receipt, the embedded signature can be decrypted using the sender's public key, and the resultant hash can be compared with a new hash of the received data. A match may indicate the snapshot's authenticity and that it remains unaltered since its generation, thereby ensuring both the source's legitimacy and the data's integrity.

As shown in block 214, the process flow includes displaying the snapshot on the user input device. In some embodiments, the snapshot may be displayed on the user input device based on device characteristics of the user input device. To this end, the system may initially determine the device type associated with the user input device. The snapshot, once prepared, may then be securely transmitted to the user input device. In some embodiments, the snapshot may be dynamically formatted based on the user input device's display capabilities. For touchscreen devices, interactive elements might be integrated, allowing users to engage with the data. In particular embodiments, the system may also adjust display settings like resolution to ensure clarity. If there are issues in loading, the user might be notified, and possible actions suggested. If the user input device is determined to be equipped with advanced graphical capabilities, the system may incorporate transitions or animations to improve user experience as the snapshot is displayed.

FIG. 3 illustrates a data flow diagram for dynamic, secure, token-based snapshot generation, in accordance with an embodiment of the disclosure. As shown in FIG. 3, upon initialization, the system (e.g., system 130) may establish an alternative access point 301 on a user input device 140 connected to a designated application. When a user submits a request through the alternative access point 301 on the user input device 140 to view a snapshot of their associated resource repositories 312, the token generator 304 produces a token 302 derived from the user's request. This token 302 is then utilized by the authentication subsystem 306 to verify the user's identity and the validity of the request. Only after successful authentication does the system proceed. The snapshot generator 308, upon receiving authentication confirmation, creates a snapshot of the specified resource repositories 312 in accordance with pre-defined user preferences. In addition, the data analytics subsystem 314 determines a change in account information by comparing the snapshot of the account information associated with the current user request to a snapshot summary from the prior user request stored in a snapshot database 316. Following this analysis, the current snapshot is augmented with the identified change in account information for each respective resource repository. Before presenting the snapshot to the user, the digital signature subsystem 310 embeds the snapshot with a digital signature, ensuring its authenticity. Subsequently, the authenticated snapshot is transmitted to the user input device for display.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamic, secure, token-based snapshot generation, the system comprising:
    a processing device;
    a non-transitory storage device containing instructions when executed by the processing device, causes the processing device to:
        establish an alternative access point on a user input device, wherein the alternative access point is operatively coupled to an application, wherein the alternative access point is a deep link, wherein the deep link is a direct pathway that bypasses initial layers of the application to access a specific location and function within the application, wherein the specific location and function are associated with a snapshot of one or more resource repositories associated with a user;

receive, via the alternative access point, a user request to receive the snapshot of the one or more resource repositories associated with the user;

generate, using a token generator, a token based on at least the user request;

authenticate, using an authentication subsystem, the user using the token to confirm legitimacy of the user request;

generate, using a snapshot generator, the snapshot of the one or more resource repositories based on at least confirming the legitimacy of the user request, wherein the snapshot is generated based on pre-defined user preferences;

embed, using a digital signature subsystem, the snapshot with a digital signature serving as an attestation; and display the snapshot on the user input device.

2. The system of claim 1, wherein executing the instructions further causes the processing device to:

dynamically retrieve an account information from each resource repository;

compile the account information received from each resource repository, wherein compiling further comprises generating a summary of account information received from each resource repository;

determine user preferences associated with the user request; and generate the snapshot using the summary of account information received from each resource repository in accordance with the user preferences.

3. The system of claim 2, wherein executing the instructions further causes the processing device to:

retrieve information associated with a prior snapshot of the user, wherein the prior snapshot comprises a summary of account information received from each resource repository in response to a prior user request;

determine, using a data analytics subsystem, a difference in account information based on at least the summary of account information associated with the user request and the summary of account information associated with the prior user request; and populate the snapshot with the difference in account information for each resource repository.

4. The system of claim 1, wherein the token comprises at least one of a unique identifier associated with the user input device, a time stamp of the user request, an originating Internet protocol (IP) address, and authentication credentials of the user required to access the resource repository.

5. The system of claim 1, wherein the token is unique, non-reusable, and is generated specifically for the user request.

6. The system of claim 1, wherein executing the instructions further causes the processing device to:

receive, from the user input device, user preferences associated with the generation of the snapshot, wherein the user preferences comprise at least a pre-define format.

7. The system of claim 1, wherein the pre-defined format comprises at least a text-based format, a data interchange format, a document format, an image format, a spreadsheet format, a presentation format, audio format, video format, and database format.

8. The system of claim 1, wherein the alternative access point is an enhancement associated with the application, wherein the enhancement is configured to allow the user to request the snapshot without requiring the user to authenticate themselves with the application.

9. The system of claim 1, wherein the alternative access point is a widget associated with the application, wherein the widget is configurable on the user input device enabling a direct link to request the snapshot.

10. The system of claim 1, wherein the alternative access point is a deep link into the application configured to guide the user request to directly to portions of the application capable of providing the snapshot.

11. The system of claim 1, wherein the alternative access point is a custom voice command associated with the application.

12. A computer program product for dynamic, secure, token-based snapshot generation, the computer program product comprising a non-transitory computer-readable medium comprising code configured to cause an apparatus to:

establish an alternative access point on a user input device, wherein the alternative access point is operatively coupled to an application, wherein the alternative access point is a deep link, wherein the deep link is a direct pathway that bypasses initial layers of the application to access a specific location and function within the application, wherein the specific location and function are associated with a snapshot of one or more resource repositories associated with a user;

receive, via the alternative access point, a user request to receive the snapshot of the one or more resource repositories associated with the user;

generate, using a token generator, a token based on at least the user request;

authenticate, using an authentication subsystem, the user using the token to confirm legitimacy of the user request;

generate, using a snapshot generator, the snapshot of the one or more resource repositories based on at least confirming the legitimacy of the user request, wherein the snapshot is generated based on pre-defined user preferences;

embed, using a digital signature subsystem, the snapshot with a digital signature serving as an attestation; and display the snapshot on the user input device.

13. The computer program product of claim 12, wherein the code further causes the apparatus to:

dynamically retrieve an account information from each resource repository;

compile the account information received from each resource repository, wherein compiling further comprises generating a summary of account information received from each resource repository;

determine user preferences associated with the user request; and generate the snapshot using the summary of account information received from each resource repository in accordance with the user preferences.

14. The computer program product of claim 13, wherein the code further causes the apparatus to:

retrieve information associated with a prior snapshot of the user, wherein the prior snapshot comprises a summary of account information received from each resource repository in response to a prior user request;

determine, using a data analytics subsystem, a difference in account information based on at least the summary of account information associated with the user request and the summary of account information associated with the prior user request; and populate the snapshot with the difference in account information for each resource repository.

15. The computer program product of claim 12, wherein the token comprises at least one of a unique identifier associated with the user input device, a time stamp of the user request, an originating Internet protocol (IP) address, and authentication credentials of the user required to access the resource repository.

16. The computer program product of claim 12, wherein the token is unique, non-reusable, and is generated specifically for the user request.

17. The computer program product of claim 12, wherein the code further causes the apparatus to:

receive, from the user input device, user preferences associated with the generation of the snapshot, wherein the user preferences comprise at least a pre-define format.

18. The computer program product of claim 12, wherein the pre-defined format comprises at least a text-based format, a data interchange format, a document format, an image format, a spreadsheet format, a presentation format, audio format, video format, and database format.

19. A method for dynamic, secure, token-based snapshot generation, the method comprising:

establishing an alternative access point on a user input device, wherein the alternative access point is operatively coupled to an application, wherein the alternative access point is a deep link, wherein the deep link is a direct pathway that bypasses initial layers of the application to access a specific location and function within the application, wherein the specific location and function are associated with a snapshot of one or more resource repositories associated with a user;

receiving, via the alternative access point, a user request to receive the snapshot of the one or more resource repositories associated with the user;

generating, using a token generator, a token based on at least the user request;

authenticating, using an authentication subsystem, the user using the token to confirm legitimacy of the user request;

generating, using a snapshot generator, the snapshot of the one or more resource repositories based on at least confirming the legitimacy of the user request, wherein the snapshot is generated based on pre-defined user preferences;

embedding, using a digital signature subsystem, the snapshot with a digital signature serving as an attestation; and displaying the snapshot on the user input device.

20. The method of claim 19, wherein the method further comprises:

dynamically retrieving an account information from each resource repository;

compiling the account information received from each resource repository, wherein compiling further comprises generating a summary of account information received from each resource repository;

determining user preferences associated with the user request; and generating the snapshot using the summary of account information received from each resource repository in accordance with the user preferences.

* * * * *